United States Patent [19]

Suzuki et al.

[11] 4,187,341
[45] Feb. 5, 1980

[54] MAGNETIC RECORDING TAPE

[75] Inventors: Masaaki Suzuki; Osamu Suzuki; Goro Akashi, all of Odawara, Japan

[73] Assignee: Fuji Photo Film Co., Ltd., Minami-ashigara, Japan

[21] Appl. No.: 852,574

[22] Filed: Nov. 17, 1977

[30] Foreign Application Priority Data

Nov. 26, 1976 [JP] Japan ................................ 51-141323

[51] Int. Cl.² .......................... B32B 7/02; B32B 5/16
[52] U.S. Cl. ................................ 428/213; 360/134; 427/128; 428/220; 428/212; 428/329; 428/337; 428/900
[58] Field of Search ............... 428/212, 213, 323, 220, 428/900, 329, 337; 427/128, 132; 360/134; 346/74.1

[56] References Cited

U.S. PATENT DOCUMENTS

| 3,139,354 | 6/1964 | Wolff | 427/128 |
| 3,240,621 | 3/1966 | Flower, Jr. et al. | 428/900 |
| 4,002,804 | 1/1977 | Akashi et al. | 428/900 |

FOREIGN PATENT DOCUMENTS 51-72407 12/1974 Japan ................................ 428/900

Primary Examiner—George F. Lesmes
Assistant Examiner—P. Thibodeau
Attorney, Agent, or Firm—Armstrong, Nikaido, Marmelstein & Kubovcik

[57] ABSTRACT

In a magnetic recording tape having a total thickness of 4.0 to 14.5 microns, the base thickness to magnetic layer thickness ratio is from 2:3 to 3:2, the base Young's modulus to magnetic layer Young's modulus ratio is from 1:2 to 2:1 and the tensile strength at 0.5% elongation is $\sqrt{d}/16$ Kg or more to the total thickness d (micron).

10 Claims, 1 Drawing Figure

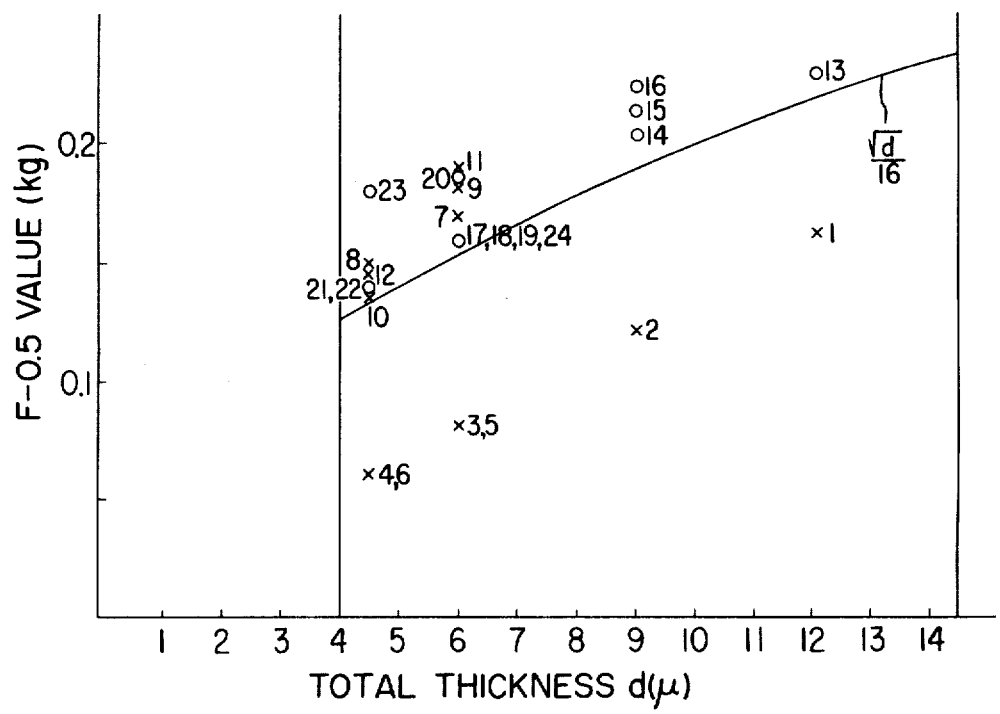

MAGNETIC RECORDING TAPE

BACKGROUND OF THE INVENTION

1. Field of the Invention

The present invention relates to a magnetic recording tape and more particularly, it is concerned with an improved magnetic recording tape having a small total thickness but having an excellent recording and reproducing property as well as a practical durability.

2. Description of the Prior Art

In order to raise the packing density of a magnetic recording tape, it has hitherto been proposed to reduce the total thickness of the tape and, for example, Japanese Patent Publication No. 4623/1974 discloses a Philips type cassette tape, whereby the practical durability can be improved. That is to say, magnetic recording tapes have the disadvantage that, if the thickness is decreased, the recording and reproducing property is deteriorated even by a slight external force since the tape tends to be deformed, but, in the Philips type cassette tape, this disadvantage can be overcome by packing the magnetic recording tape into a magazine so that it be used without touching. However, even the Philips type cassette tape has also the disadvantage that the tape speed is markedly uneven even during ordinary tape running and a tape vibration is induced at a position where the tape is pressed to a guide roller or head, when the total thickness of the tape is 14.5 microns or less and the tensile strength at an elongation of 0.5% (which will hereinafter be referred to as "F-0.5 Value") is about 0.13 d (Kg) to the total thickness d ($\mu$). Furthermore, in some cases, a magnetic recording tape with a small total thickness encounters a large winding disorder and in extreme cases, the end of the tape is broken so that it be of no use.

In the Philips type cassette tape of the prior art, where the tape has a total thickness of $13\pm1.5\mu$ (C 90 Tape according to Jiki Tape Kogyokai Standard MTS-101) or where the tape has a magnetic layer with a thickness of about 4 and a total thickness of $9\pm1.5\mu$(C 120 Tape), it has been employed to make thinner the thickness of a base and that of a magnetic layer proportionally based on that the thickness of the magnetic layer is about $3\mu$ and the proportion of the thickness of the magnetic layer to the total thickness is about 33%, so as to reinforce the above described mechanical strength. When magnetic recording tapes with further increased packing densities, for example, C 180 Tape having a mean thickness of $6\mu$ and C 240 Tape having a mean thickness of $4.5\mu$ are prepared, it is necessary to adjust the total thickness to $7.5\mu$ or less and to $5.5\mu$ or less respectively. Furthermore, when a magnetic layer is provided by blending and coating a magnetic powder and binder, it is not desirable to make thinner proportionally the thickness of the magnetic layer from the standpoint of its magnetic property. When a magnetic recording tape with a decreased thickness of magnetic layer is used in the same recording and reproducing system as used before decreasing the thickness of magnetic layer, it exhibits a mortal disadvantage that the harmonic distortion factor at a constant output is increased and, consequently, the dynamic range representing a range of from the noise level to the output level at 5% third harmonic distortion as to a signal to be recorded is narrowed.

SUMMARY OF THE INVENTION

It is an object of the present invention to provide a magnetic recording tape having improved characteristics.

It is another object of the present invention to provide a magnetic recording tape with a decreased total thickness and with a good recording and reproducing property as well as an excellent practical durability.

These objects can be attained by a magnetic recording tape, which has a total thickness of 4.0 to 14.5$\mu$, a base to magnetic layer thickness ratio of 2:3 to 3:2, a base to magnetic layer Young's modulus ratio of 1:2 to 2:1 and a tensile strength at 0.5% elongation of at least $\sqrt{d}/16$ (Kg) to the total thickness d($\mu$).

BRIEF DESCRIPTION OF THE DRAWING

The accompanying figure is a graph showing the relation between the total thickness d($\mu$) of a magnetic recording tape and F-0.5 value (Kg).

DETAILED DESCRIPTION OF THE INVENTION

We, the inventors, have made various efforts to overcome the above described disadvantages of the prior art and to improve the recording and reproducing properties and practical durability of a magnetic recording tape having a small total thickness, i.e., 14.5$\mu$ or less, and consequently, have reached the present invention. It is found, as a result of our studies, that it is insufficient to raise the Young's modulus of a material as high as possible with the decrease of the total thickness of a magnetic recording tape, whereby to increase F-0.5 value only, and a magnetic recording tape having a substantially practical durability can only be obtained by increasing the Young's modulus of the magnetic layer as high as possible while keeping the Young's moduli of the base and magnetic layer substantially equal and, at the same time, adjusting the thickness of the base and magnetic layer to a substantially equal value, even if F-0.5 value is not so large, that is, approximately $\sqrt{d}/16$ (Kg) to the total thickness d($\mu$). It is further found that, if the difference between the Young's moduli of the base and magnetic layer is increased twice or more, the base and magnetic layer tend to be stripped each other.

The present invention is accomplished on the basis of this finding and thus provides a magnetic recording tape, characterized in that the total thickness is in the range of 4.0 to 14.5$\mu$, the base thickness to magnetic layer thickness ratio being from 2:3 to 3:2, the base to magnetic layer Young's modulus ratio is in the range of 1:2 to 2:1 and the tensile strength at 0.5% elongation is $\sqrt{d}/16$ Kg to the total thickness d($\mu$).

By keeping substantially same the mechanical strength of a base and magnetic layer according to the present invention, an exessive strain at the adhesion interface between the base and magnetic layer to an external force such as bending or tension of the magnetic recording tape can be reduced and the durability thereof on practical use can markedly be improved. In particular, the resistance of a magnetic recording tape to repeated bending thereof to both the sides of the base side and magnetic layer side can be increased and the durability to running to a magnetic recording head can markedly be improved by keeping the base thickness to magnetic layer thickness ratio in the range of 2:3 to 3:2. If the total thickness of a magnetic recording tape is less than 4.0μ, this magnetic recording tape is of no use even though designed by extrapolation from the present invention, since the durability thereof is substantially satisfactory, but the wow flutter (sound unevenness due to running) and SKEW (time deviation error of signal) are increased.

As a base having a Young's modulus of 1,000 Kg or less, there are generally used polyethylene terephthalate films which are biaxially stretched films (longitudinal and lateral Young's moduli: about 400 Kg/mm$^2$ each) which are further stretched in the longitudinal direction. In the order of Young's moduli of 700 Kg/mm$^2$, 870 Kg/mm$^2$ and 1,000 Kg/mm$^2$, the third (longitudinal direction) stretching rotios are 1.5 times, 2.4 times and 3.1 times. As a base having a Young's modulus exceeding 1,000 Kg/mm$^2$, there are generally used aromatic polyamide films having a para-linkage of 70% or more based on all the linkages, which are biaxially stretched films (longitudinal and lateral Young's moduli: about 1,000 Kg/mm$^2$ each) as described in Japanese Patent Application (OPI) Nos. 98897/1974, 55679/1975 and 129201/1976, which are further stretched in the longitudinal direction. In the order of Young's moduli of 1,500 Kg/mm$^2$, 2,000 Kg/mm$^2$ and 2,400 Kg/mm$^2$, the third (longitudinal direction) stretching rotios are 1.15 times, 2 times and 2.9 times.

The Young's modulus of the magnetic layer depends largely upon the ratio of a binder component and a solid powder component, the shape, arrangement, distribution, etc. of a solid powder. In order to obtain a large value thereof, in particular, it is necessary to increase the quantity of a hardening component and, for example, the relation of the Young's modulus of a magnetic layer with the quantity of a triisocyanate in the case of forming the magnetic layer as shown in the following Examples (Examples 9 to 12) is as follows.

| Quantity of Triisocyanate (Examples 9-12) (parts by weight) | Young's Modulus (Kg/mm$^2$) |
| --- | --- |
| 1 | 890 |
| 2 | 1170 |
| 3 | 1410 |
| 4 | 1590 |
| 5 | 1740 |
| 6 | 1890 |

In a magnetic recording tape used in the Philips type cassette tape of the prior art, on the other hand, the base and magnetic layer have substantially the same Young's modulus, that is, 600 to 700 Kg/mm$^2$, so F-0.5 value is suitable, that is, 0.21 to 0.24 Kg in the case of C 60 Tape having a mean thickness of 18μ, but F-0.5 value is insufficient, that is, 0.14 to 0.16 Kg in the case of C 90 Tape having a mean thickness of 12μ and 0.10 to 0.12 Kg in the case of C 120 Tape having a mean thickness of 9μ. Furthermore, when a magnetic recording tape with a small total thickness such as C 180 Tape having a mean thickness of 6μ and C 240 Tape having a mean thickness of 4.5μ is designed, it is very difficult to reproduce the F-0.5 value obtained in C 60 Tape. It is also found that, even if a magnetic recording tape having a relatively high F-0.5 value is prepared, for example, by providing a magnetic recording layer on a high Young's modulus base having a thickness of 4μ to give a total thickness of 6μ, the foregoing durability on practical use is only slightly improved and insufficient in fact and, in particular, deformation of a magnetic recording tape in a case where it is taken up under a constant tension and stored becomes remarkable. If such a deformation takes place, the running is unstable.

The magnetic recording tape of the present invention can be obtained by mixing and kneading a ferromagnetic powder, a binder, a dispersing agent, a lubricant, etc. with an organic solvent to prepare a magnetic coating composition and then applying the coating composition to a non-magnetic support base.

As the ferromagnetic powder used in the present invention, there can be used known ferromagnetic fine powders such as fine powders of $\gamma$-Fe$_2$O$_3$, Co-doped $\gamma$-Fe$_2$O$_3$, Fe$_3$O$_4$, Co-doped Fe$_3$O$_4$, CrO$_2$, Co-Ni-P alloys and Co-Ni-Fe alloys and the like, as disclosed in Japanese Patent Publication Nos. 14090/1969, 18372/1970, 28466/1971, 38755/1971, 4286/1972, 12422/1972, 17284/1972, 18509/1972, 18573/1972, 22062/1972 and 22513/1972.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 20,000 and a degree of polymerization of the order of about 100 to 2,000, for example, vinyl chloride/vinyl acetate copolymers, vinyl chloride/vinylidene chloride copolymers, vinyl chloride/acrylonitrile copolymers, acrylate/acrylonitrile copolymers, acrylate/vinylidene chloride copolymers, acrylate/styrene copolymers, methacrylate/acrylonitrile copolymers, methacrylate/vinylidene chloride copolymers, methacrylate/styrene copolymers, urethane elastomers, polyvinyl fluoride, vinylidene chloride/acrylonitrile copolymers, butadiene/acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene/butadiene copolymers, polyester resins, chlorovinyl ether/acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973; U.S. Pat. Nos. 3,144,352, 3,419,420, 3,499,789, 3,713,887, etc.

Suitable thermosetting resins have a molecular weight of about 200,000 or less as a coating solution, and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins, urea resins, melamine resins, alkyd resins, silicone resins, acryl based reactive resins, mixtures of high molecular weight polyester resins and isocyanate prepolymers, mixtures of methacrylic acid salt copolymers and diisocyanate prepolymers, mixtures of polyesterpolyols and polyisocyanates, urea-formaldehyde resins, mixtures of low molecular weight glycols, high molecular weight diols and triphenylmethane triisocyanates, polyamide resins and mixtures thereof, etc. Examples of these resins are described in, for example, Japanese patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,353, 3,320,090, 3,437,510, 3,597,273, 3,781,210, 3,781,211, etc.

As the dispersing agent, there can be used fatty acids having 12 to 18 carbon atoms ($R_1COOH$ wherein $R_1$ is an alkyl group having 11 to 17 carbon atoms) such as capric acid, caprylic acid, lauric acid, myristic acid, palmitic acid, stearic acid, oleic acid, elaidic acid, linolic acid, linolenic acid and stearolic acid, metallic soaps such as alkali metal (Li, Na, K) salts or alkaline earth metal (Mg, Ca, Ba) salts of the above described fatty acids, lecitin, higher alcohols having 12 or more carbon atoms and their sulfuric acid esters. These dispersing agents are used preferably in a proportion of 1 to 20 parts by weight to 100 parts by weight of a binder. Examples of the dispersing agent are described in Japanese Patent Publication Nos. 28369/1964, 17945/1969 and 15001/1973 and U.S. Patent Nos. 3,387,993 and 3,470,021.

As the lubricant, there can be used silicone oils, carbon black, graphite, carbon black-grafted polymers, molybdenum disulfide, tungsten disulfide, fatty acid esters of monobasic fatty acids having 12 to 16 carbon atoms and monohydric alcohols having 3 to 12 carbon atoms and fatty acid esters of monobasic fatty acids having 17 or more carbon atoms and monohydric alcohols having 21 to 23 carbon atoms with the number of carbon atoms of the fatty acids. These lubricants are preferably used in a proportion of 0.2 to 20 parts by weight to 100 parts by weight of a binder. These lubricants are mentioned in Japanese Patent Publication No. 23889/1968, Japanese Patent Application Nos. 81543/1968 and 28647/1967, U.S. Pat. Nos. 3,470,021, 3,492,235, 3,497,411, 3,523,086, 3,625,760, 3,630,772, 3,634,253, 3,642,539 and 3,687,725, "IBM Technical Disclosure Bulletin" Vol. 9 No. 7, page 779 (December 1966) and "ELECTRONIK" 1961, No. 12, page 380.

Examples of the organic solvent used in the coating or kneading are ketones such as acetone, methyl ethyl ketone, methyl isobutyl ketone and cyclohexanone, alcohols such as methyl alcohol, ethyl alcohol, propyl alcohol and butyl alcohol, esters such as methyl acetate, ethyl acetate, butyl acetate, ethyl lactate and glycol acetate monoethyl ether, ethers and glycol ethers such as ether, glycol dimethyl ether, glycol monoethyl ether and dioxane, aromatic hydrocarbons such as benzene, toluene and xylene and chlorinated hydrocarbons such as methylene chloride, ethylene chloride, carbon tetrachloride, chloroform, ethylene chlorohydrin and dichlorobenzene and their mixtures.

Formation of the magnetic recording layer is generally carried out by dissolving or dispersing the above described composition in an organic solvent and then coating the resulting solution or dispersion onto a support.

The support can be in any form of films, tapes, sheets, disks, drums, etc., and, depending upon such a form, various materials are chosen. The support is made of polyesters such as polyethylene terephthalate, polyethylene-2,6-naphthalate and the like, polyolefins such as polypropylene and the like, cellulose derivatives such as cellulose triacetate, cellulose diacetate and the like and polycarbonates. Depending upon the object of use, moreover, non-magnetic metals such as copper, aluminum and zinc, glass, porcelain, earthenware and the like may be employed as the support.

Coating of the above described magnetic recording layer onto a support is generally carried out by any commonly used method, for example, by air doctor coating, blade coating, air knife coating, squeese coating, immersion coating, reverse roll coating, transfer roll coating, gravure coating, kiss coating, casting coating or spray coating. Other coating methods can of course be employed. Details of these coating methods are described in "Coating Engineering" page 253 to 277, published by Asakura Books Co., Mar. 20, 1971.

As well known in the art, the magnetic layer thus coated onto a support is, if necessary, subjected to a treatment for the orientation of the magnetic powder and then dried, whereby the electromagnetic conversion characteristic for the recording direction is raised. This method has been put to practical use, examples of which are disclosed in Japanese Patent Publication Nos. 5350/1965, 23624/1965, 23626/1965, 2065/1966 and 21251/1968.

The above described non-magnetic support can be subjected to the so-called back coating of the surface opposite to that having the magnetic layer thereon for the purpose of preventing static charging, magnetic print through and so on in the case of a flexible support such as films, tapes, sheets, thin flexible disks, etc. Suitable back coating techniques which can be used are described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420 and 3,166,688.

In the magnetic recording tape of the present invention, it is desirable to adjust the surface roughness to not exceeding $0.2\mu$ by a surface smoothening treatment after coating the magnetic layer and drying. When such a surface smoothening treatment is carried out by calendering, it is preferable to use the supercalendering method wherein a tape is passed through between two rolls of a metallic roll and cotton roll or synthetic resin roll such as nylon roll. The above described surface smoothening treatment is disclosed in, for example, U.S. Pat. Nos. 2,688,567, 2,998,325 and 3,783,023, DT-OS No. 2,405,222 and Japanese Patent Application (OPI) No. 53631/1974 and 10337/1975.

The Young's modulus of a magnetic layer and the F-0.5 value of a magnetic recording tape obtained according to the present invention will be apparent from the following examples.

The present invention will be explained in detail with reference to the following examples. It will be obvious to one skilled in the art that various modifications and changes can be made in the components, ratios, operational order and the like without departing from the spirit of the present invention. Therefore, the present invention should not be construed as being limited to the following examples. All parts, percents, ratios and the like are to be taken as those by weight unless otherwise indicated.

EXAMPLES 1 TO 6

| | |
|---|---|
| Ferromagnetic Fine Powder ($\gamma$-$Fe_2O_3$) | 100 parts |
| Eslec A (Commercial Name, Vinyl Chloride/ Vinyl Acetate Copolymer) | 16 parts |
| Hycar 1432 J (Commercial Name, Butadiene/ Acrylonitrile Copolymer manufactured by | |

-continued

| | |
|---|---|
| Nippon Zeon Co.) | |
| Lecitin | 1 part |
| Carbon | 8 parts |
| Silicone Resin | 0.15 part |
| Methyl Ethyl Ketone and Methyl Isobutyl Ketone (1 : 1) | 200 parts |

EXAMPLES 7 AND 8

| | |
|---|---|
| Ferromagnetic Fine Powder ($\gamma$-Fe$_2$O$_3$) | 100 parts |
| Vinylidene Chloride Resin (Vinyl Chloride 87 molar % : Vinylidene Chloride 13 molar %, Polymerization Degree : 400) | 20 parts |
| Acrylic Acid Ester/Acrylonitrile Copolymer (Copolymerization Molar Ratio: 6 : 4) | 15 parts |
| Dibutyl Phthalate | 2 parts |
| Lecitin | 1.5 parts |
| Carbon Black (Mean Particle Size: 40 $\mu$m) | 0.5 part |
| Butyl Acetate | 250 parts |

EXAMPLES 9 to 12

| | |
|---|---|
| Ferromagnetic Fine Powder | 100 parts |
| Vinylidene Chloride Resin (Vinyl Chloride/Vinylidene Chloride: 87/13 molar %, Polymerization Degree: 400) | 20 parts |
| Polyesterpolyurethane (Molecular Weight: 30,000, Reaction Product of Polyester from Adipic Acid, Diethylene Glycol and Butanediol and Diphenylmethane Diisocyanate) | 5 parts |
| Triisocyanate Compound (Commercial Name: Desmodur L-75, 75% by Ethyl Acetate Solution of Reaction Product of 3 mols of Toluene Diisocyanate and 1 mol of Trimethylolpropane, manufactured by Bayer A.G.) | 5 parts |
| Dibutyl Phthalate | 2 parts |
| Lecitin | 2 parts |
| Butyl Acetate | 250 parts |

In Examples 1 to 12, the compositions described respectively therein were adequately mixed, dispersed, coated onto the bases having the thicknesses and Young's moduli as shown in Table 1 so as to give the thickness on dry base as shown in Table 1 and then dried.

In Examples 13 to 17, the same magnetic layer composition as that of Examples 7 and 8 and in Examples 18 to 23, the same magnetic layer composition as that of Examples 9 to 12 were respectively mixed, dispersed, coated onto the bases having the thicknesses and Young's moduli as shown in Table 2 so as to give the thicknesses on dry base as shown in Table 2 and then dried.

EXAMPLE 24

The composition described in Examples 7 and 8 was adequately mixed, dispersed, coated onto a base having a thickness of 2.4$\mu$ and a Young's modulus of 1500 Kg/mm$^2$ to give a thickness on dry base of 1.8$\mu$ and dried. In addition, the composition described in Examples 9 to 12 was adequately mixed, dispersed and coated thereon to give a thickness of 1.8$\mu$ on dry base, followed by drying, thus obtaining a magnetic recording tape having a whole thickness of 6.0$\mu$ (multilayer).

The magnetic recording tapes shown in these examples were cut respectively in a width of 3.81 mm, loaded in Philips type tape cassettes and then subjected to measurement of the F-0.5 values, wow flutter values, running durability and dynamic ranges, thus obtaining results shown in Tables 1 and 2. The running durability is defined herein by the number of running until the sensitivity unevenness becomes 1 dB or more even if the running stop or failure due to tape deformation, and breakage, etc. is not caused or the winding disorder does not take place. The F-0.5 values and Young's moduli described herein are values representing the tensile strength in the longitudinal direction of the tape. It will clearly be understood from the results of Table 1 and Table 2 that the value of wow flutter is decreased with the increase of F-0.5 values and the dynamic range is widened with the increase of the thickness of a magnetic layer.

In Examples 3 to 6, there occurs a trouble that a squeal is generated between the tape and a head and recorded when used first in a cassette deck. In Example 4, the tape is wrinkled during running at the first time in a tape cassette and the running becomes bad. In Example 13 to 24, on the other hand, even the tape having a total thickness of 4.5$\mu$ exhibits a running durability of 320 times or more, preferably 1,000 times or more and can be put to practical use sufficiently.

Table 1

| | | Base | | Magnetic Layer | | |
|---|---|---|---|---|---|---|
| Example | Total Thickness ($\mu$) | Thickness ($\mu$) | Young's Modulus (Kg/mm$^2$) | Thickness ($\mu$) | Young's modulus (Kg/mm$^2$) | F-0.5 Value (Kg) |
| 1 | 12.0 | 8.0 | 700 | 4.0 | 700 | 0.160 |
| 2 | 9.0 | 6.0 | 700 | 3.0 | 700 | 0.120 |
| 3 | 6.0 | 4.0 | 700 | 2.0 | 700 | 0.080 |
| 4 | 4.5 | 3.0 | 700 | 1.5 | 700 | 0.060 |
| 5 | 6.0 | 3.0 | 700 | 3.0 | 700 | 0.080 |
| 6 | 4.5 | 2.4 | 700 | 2.1 | 700 | 0.060 |
| 7 | 6.0 | 3.0 | 2000 | 3.0 | 950 | 0.168 |
| 8 | 4.5 | 2.4 | 2400 | 2.1 | 950 | 0.147 |
| 9 | 6.0 | 4.0 | 1500 | 2.0 | 1740 | 0.180 |
| 10 | 4.5 | 3.0 | 1500 | 1.5 | 1740 | 0.135 |
| 11 | 6.0 | 2.0 | 1500 | 4.0 | 1740 | 0.189 |
| 12 | 4.5 | 1.5 | 1500 | 3.0 | 1740 | 0.142 |

| Wow Flutter (%) | Running Durability (number) | Dynamic Range (dB) | Assessment | | |
|---|---|---|---|---|---|
| | | | Ratio of Thicknesses (b:m) | Ratio of Young's Moduli (b:m) | F-0.5 Value |
| 0.10 | 170 | 72 | 2 : 1 (B) | 1 : 1 (A) | 0.217 (B) |
| 0.48 | 10 | 70 | (B) | (A) | 0.188 (B) |
| 1.6 | 1 | 68 | (B) | (A) | 0.153 (B) |

Table 1—continued

| | | | | | |
|---|---|---|---|---|---|
| 7.2 | 0 | 66 | (B) | (A) | 0.133 (B) |
| 0.8 | 2 | 70 | 1 : 1 (A) | (A) | (B) |
| 3.7 | 1 | 69 | (A) | (A) | (B) |
| 0.09 | 190 | 70 | 1 : 1 (A) | 2 : 1 *(B) | (A) |
| 0.12 | 89 | 69 | (A) | 2.5 : 1 (B) | (A) |
| 0.06 | 220 | 68 | 2 : 1 (B) | (A) | (A) |
| 0.14 | 32 | 66 | (B) | (A) | (A) |
| 0.06 | 216 | 72 | 1 : 2 (B) | (A) | (A) |
| 0.12 | 36 | 70 | (B) | (A) | (A) |

Note:
*Stripped
(A) within the scope of the present invention
(B) outside the present invention Table 2

| | | Base | | Magnetic Layer | | |
|---|---|---|---|---|---|---|
| Example | Total Thickness ($\mu$) | Thickness ($\mu$) | Young's Modulus ($Kg/mm^2$) | Thickness ($\mu$) | Young's Modulus ($Kg/mm^2$) | F-0.5 Value (Kg) |
| 13 | 12.0 | 6.0 | 1000 | 6.0 | 950 | 0.222 |
| 14 | 9.0 | 3.6 | 1500 | 5.4 | 950 | 0.200 |
| 15 | 9.0 | 4.5 | 1500 | 4.5 | 950 | 0.209 |
| 16 | 9.0 | 5.4 | 1500 | 3.6 | 950 | 0.219 |
| 17 | 6.0 | 2.4 | 1900 | 3.0 | 950 | 0.162 |
| 18 | 6.0 | 3.0 | 870 | 3.6 | 1740 | 0.159 |
| 19 | 6.0 | 3.6 | 1000 | 3.0 | 1740 | 0.156 |
| 20 | 6.0 | 3.0 | 1500 | 2.4 | 1740 | 0.182 |
| 21 | 4.5 | 2.7 | 1500 | 1.8 | 1740 | 0.136 |
| 22 | 4.5 | 2.4 | 1500 | 2.1 | 1740 | 0.138 |
| 23 | 4.5 | 2.4 | 2400 | 2.1 | 1740 | 0.179 |
| 24 | 6.0 | 2.4 | 1500 | lower 1.8 upper 1.8 | 950 1740 | 0.160 |

| Wow Flutter (%) | Running Durability (number) | Dynamic Range (dB) | Assessment | | F-0.5 Value |
|---|---|---|---|---|---|
| | | | Ratio of Thickness (b:m) | Ratio of Young's Moduli (b:m) | |
| 0.04 | M* | 75 | 1 : 1 (A) | (A) | (A) |
| 0.05 | M | 74 | 2 : 3 (A) | (A) | (A) |
| 0.05 | M | 73 | 1 : 1 (A) | (A) | (A) |
| 0.04 | M | 72 | 3 : 2 (A) | (A) | (A) |
| 0.07 | 430 | 70 | (A) | 2 : 1 (A) | (A) |
| 0.08 | 570 | 72 | (A) | 1 : 2 (A) | (A) |
| 0.09 | 820 | 70 | (A) | (A) | (A) |
| 0.06 | M | 69 | (A) | (A) | (A) |
| 0.12 | 520 | 67 | 3 : 2 (A) | (A) | (A) |
| 0.11 | 720 | 69 | (A) | (A) | (A) |
| 0.06 | M | 69 | (A) | 1.4 : 1 (A) | (A) |
| 0.07 | M | 74 | 2 : 3 (A) | (A) | (A) |

Note
*M means 1000 times or more.

In the accompanying drawing, there is shown the relation of F-0.5 value and $\sqrt{d}/16$ in Examples 1 to 24 (O: Examples 13-24; X: Examples 1-12).

What is claimed is:

1. A magnetic recording tape comprising a base layer and a magnetic layer, said tape having a total thickness of 4.0 to 14.5$\mu$, a base to magnetic layer thickness ratio of 2:3 to 3:2, a base to magnetic layer Young's modulus ratio of 1:2 to 2:1 and a tensile strength at 0.5% elongation of at least $\sqrt{d}/16$ (Kg), where d is the total thickness (in microns) of the tape.

2. The magnetic recording tape as claimed in claim 1, wherein the base is of a material selected from the group consisting of polyesters, polyolefins, cellulose derivatives, polycarbonates, non-magnetic metals and ceramics.

3. The magnetic recording tape as claimed in claim 1, wherein the base has a thickness of 2.4 to 8.7$\mu$.

4. The magnetic recording tape as claimed in claim 1, wherein the magnetic layer contains a magnetic powder and a binder.

5. The magnetic recording tape as claimed in claim 4, wherein the magnetic powder is selected from the group consisting of fine powders of $\gamma$-$Fe_2O_3$, Co-doped $\gamma$-$Fe_2O_3$, $Fe_3O_4$, Co-doped $Fe_3O_4$, $CrO_2$, Co-Ni-P alloys and Co-Ni-Fe alloys.

6. The magnetic recording tape as claimed in claim 4, wherein the binder is selected from the group consisting of thermoplastic resins and thermosetting resins.

7. The magnetic recording tape as claimed in claim 1, wherein the magnetic recording layer further contains dispersing agents and lubricants.

8. The magnetic recording tape as claimed in claim 1, wherein the magnetic layer is formed by coating onto the support base a magnetic powder, binder, dispersing agent and lubricant with an organic solvent.

9. The magnetic recording tape as claimed in claim 8, wherein the organic solvent is selected from the group consisting of ketones, alcohols, esters, ethers, glycol ethers, aromatic hydrocarbons and chlorinated hydrocarbons.

10. The magnetic recording tape as claimed in claim 1, wherein the magnetic layer has a Young's modulus of about 700 to 1890 $Kg/mm^2$.